US006652783B2

(12) United States Patent
Fujita et al.

(10) Patent No.: US 6,652,783 B2
(45) Date of Patent: Nov. 25, 2003

(54) MAGNET UNIT AND METHOD OF PRODUCTION THEREOF

(75) Inventors: Etsunori Fujita, Hiroshima (JP); Yoshimi Enoki, Hiroshima (JP); Hiroki Oshimo, Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 0 days.

(21) Appl. No.: 10/016,292

(22) Filed: Oct. 30, 2001

(65) Prior Publication Data

US 2002/0050671 A1 May 2, 2002

(30) Foreign Application Priority Data

Oct. 30, 2000 (JP) ........................................ 2000-330628
Sep. 25, 2001 (JP) ........................................ 2001-292295

(51) Int. Cl.[7] ................................................ E04B 1/16
(52) U.S. Cl. ...................... 264/35; 267/150; 267/267; 267/140.15
(58) Field of Search ............................ 267/150, 267, 267/140.15; 264/35, DIG. 58

(56) References Cited

U.S. PATENT DOCUMENTS

| 3,842,753 | A | * | 10/1974 | Theodore et al. ......... 105/157.1 |
| 5,117,553 | A | * | 6/1992 | Kliman ......................... 29/598 |
| 5,248,133 | A | * | 9/1993 | Okamoto et al. ............ 267/136 |
| 6,042,757 | A | * | 3/2000 | Abe et al. ...................... 264/28 |
| 6,232,689 | B1 | * | 5/2001 | Fujita et al. .................. 310/103 |
| 6,241,059 | B1 | * | 6/2001 | Fujita et al. .................. 188/267 |
| 6,241,224 | B1 | * | 6/2001 | Leibman ...................... 267/279 |
| 6,325,365 | B1 | * | 12/2001 | Fujita et al. ............ 267/140.15 |
| 6,336,627 | B1 | * | 1/2002 | Fujita et al. .................. 267/131 |
| 6,343,419 | B1 | * | 2/2002 | Litman et al. ............. 29/895.32 |
| 6,366,190 | B1 | * | 4/2002 | Fujita et al. .................. 335/285 |
| 6,378,671 | B1 | * | 4/2002 | Carlson .................... 188/267.2 |
| 6,419,647 | B1 | * | 7/2002 | Fujita et al. .................. 600/595 |

OTHER PUBLICATIONS

SAE Trans. J. Passenger Cars, 106–6 (1997), 2662–2633.
SAE Trans. J. Passenger Cars, 108–6 (1999), 2893–2908.
DETC2001,VIB–21642 (2001), 650 "An Experimental Study For Collision Stimulus Device Using a Magneto–Spring"; Fujita, E.

* cited by examiner

*Primary Examiner*—Jack Lavinder
*Assistant Examiner*—Benjamin A. Pezzlo
(74) *Attorney, Agent, or Firm*—Steinberg & Raskin, P.C.

(57) ABSTRACT

The object of the present invention is to improve the production efficiency by making its bonding process unnecessary to simplify the production process. The method of production comprises the step of integrally incorporating a magnetic material when the stationary holders 21 and 22 of the stationary member and the movable holder 31 of the movable member 30 are molded with a non-magnetic material such as a plastic material and the like. Therefore, a magnet unit in which the stationary magnets 23 and 24 or the movable magnet 32 is integrally incorporated into the stationary holders 21 and 22 or the movable holder 31 can be provided only by giving magnetization treatment on the magnetic material without using a bonding process.

17 Claims, 5 Drawing Sheets

MAGNET UNIT AND METHOD OF PRODUCTION THEREOF

BACKGROUND OF THE INVENTION

The present invention relates to a magnet unit containing a magnetic spring device, and more particularly to a magnet unit suitable for being used as a component in a vibration damping apparatus, for instance, such as a suspension unit of a vehicle seat, a train seat, or a boat seat, an engine mount, and the like.

A variety of vibration damping materials, vibration dampers, and control techniques have been commonly used to reduce vibration and noise caused by a machine or an apparatus which itself is typically constructed of a low damping material in order to ensure its rigidity.

Damage to human body and its nervous system due to their exposures to vibration has become a serious problem with the ever increasing vehicle speed. Such a damage shows many symptoms such as fatigue, headache, stiffness of shoulders, lumbago, and amblyopia. In general, vibration isolation is achieved by a damping apparatus with a properly matched spring such as metal springs or air springs and damping materials such as rubber, viscoelastic materials, or dampers. However, the dynamic magnification and the loss factor of the damping apparatus tends to be related to each other. More particularly, a reduction in dynamic magnification to improve low-frequency characteristics of the damping apparatus tends to reduce the loss factor, resulting in the damping apparatus being too firm. An increase in the loss factor of the damping apparatus to improve high-frequency characteristics leads to an increase in its dynamic magnification, resulting in the damping apparatus being too soft and a poor damping efficiency at low-frequency. Many attempts have been made in the prior art to suppress vibration by semi-active control or active control or by using a passive damper containing a dynamic vibration damper.

A vibration damping apparatus containing a magnetic spring device, and having a spring constant (elastic constant) being substantially pseudo-zero by incorporating a damping member such as a metal spring, a rubber material, has been recently disclosed. The present inventors have proposed a variety of the magnetic spring devices and vibration damping apparatus using the magnetic spring devices.

A magnetic spring device creates damping characteristics by utilizing a change of the magnetic field accompanied by relative displacement of a stationary magnet and a movable magnet, caused by an input vibration. In the magnetic spring devices in the prior art, the stationary magnet or the movable magnet is fixed with an adhesive to the stationary holder holding the stationary magnet or the movable holder holding the movable magnet.

Accordingly, whatever the case may be, in the production of the magnetic spring device, it becomes inevitably necessary to provide a bonding process to bond the magnets to the holders respectively. The fixing of the magnet with an adhesive requires to leave the assembly of the magnet and the holder at least for about one day until the adhesive is hardened, thereby causing a disadvantage in regard to the production efficiency. Besides, the spring characteristics (spring constant) and the damping force of the magnetic spring device have been determined by the magnetic force, magnitude, thickness, and the number of poles of the permanent magnet used, and no proposal has been made for adjusting the spring characteristics with other means except the above means. Especially in the present invention, since the stationary magnet or the movable magnet is not fixed with an adhesive, it is not easy to take out these magnets and replace them with other magnets for adjusting its spring constant and damping force.

SUMMARY OF THE INVENTION

The present invention has been made to overcome the foregoing disadvantage of the prior art, and its object is to provide a magnet unit which can be used as a magnetic spring device which eliminates the bonding process and simplifies the production process so that the production efficiency is improved.

In addition to improving the production efficiency, it is another object of the present invention to provide a magnet unit of which the spring constant and the damping force can be adjusted by adjusting component members other than the magnet without replacement of the magnet itself.

Still another object of the present invention is to provide a method of producing a magnet unit which eliminates the bonding process and simplifies its production process to improve the production efficiency.

To attain the aforesaid objects, in accordance with one aspect of the present invention, a magnet unit is provided. The magnet unit composes a magnetic spring device which is comprised of a movable member disposed in a relatively movable state to a stationary member, a stationary magnet supported by a stationary holder, and a movable magnet supported by a movable holder, wherein the stationary holder and the movable holder are made of a non-magnetic material, and at least either of the stationary magnets or the movable magnets is made of a magnetic material integrally incorporated when the stationary holder or the movable holder made of a non-magnetic material is molded.

In a preferred embodiment of the present invention, a non-magnetic material making the stationary holder or the movable holder comprises a plastic material.

In a preferred embodiment of the present invention, a thickness adjuster made of a magnetic material is laminated on the stationary magnet to make its thickness substantially equal to the thickness of the stationary holder.

In a preferred embodiment of the present invention, an outer frame made of a magnetic material, laminated on the stationary magnet, and at least a portion of which functions as a yoke is provided.

In a preferred embodiment of the present invention, the outer frame varies the leakage flux amount by changing at least one of the factors among thickness, magnitude, or the number of the outer frames to be disposed so that the magnetic force of the stationary magnet to the movable magnet can be adjusted.

In a preferred embodiment of the present invention, an outer frame made of a magnetic material, laminated on the thick adjuster, and at least a portion of the outer frame functions as a yoke is provided.

In another preferred embodiment of the present invention, the outer frame varies the leakage flux amount by changing at least one of the factors among thickness, magnitude, or the number of the outer frames to be disposed so that the magnetic force of the stationary magnet to the movable magnet can be adjusted.

In a preferred embodiment of the present invention, a slide member which comes in slide contact with the other party of the movable member or the stationary member when the movable member moves relatively is provided at least on either of the movable member or the stationary member.

In a preferred embodiment of the present invention, the slide member is made of a magnetic material.

In a preferred embodiment of the present invention, the slide member is made of a non-magnetic material.

In a preferred embodiment of the present invention, a magnet unit composing a magnetic spring device having two degrees of freedom comprises a pair of the stationary members oppposedly disposed at a distance from each other, and the movable member disposed between this pair of the stationary members, wherein the movable member moves relatively in two directions along the opposing face direction of the pair of the stationary members and along the direction intersecting substantially at right angles thereto.

In a preferred embodiment of the present invention, a magnet unit composing a magnetic spring device having two degrees of freedom comprises three or more of the stationary members oppposedly disposed at a distance from each other, and the movable member disposed between the adjacent stationary members, wherein the movable member moves relatively in two directions along the opposing face direction of the pair of the stationary members and along the direction intersecting substantially at right angles thereto.

In a preferred embodiment of the present invention, a magnet unit composes a magnetic spring device which is comprised of a movable member disposed in a relatively movable state to a stationary member, a stationary magnet supported by a stationary holder, and a movable magnet supported by a movable holder, wherein the stationary holder and the movable holder are made of a non-magnetic material, at least either of the stationary magnet or the movable magnet is made of a magnetic material integrally incorporated when the stationary holder or the movable holder made of a non-magnetic material is molded, and by changing at least one of the factors among thickness, magnitude, or the number of the outer frames to be disposed, made of a magnetic material, laminated on the stationary magnet, and at least one portion thereof functioning as a yoke, the leakage flux amount is varied so that the magnetic force of the stationary magnet to the movable magnet can be adjusted, thereby the spring characteristics of the magnetic spring device can be adjusted at will.

In a preferred embodiment of the present invention, a magnet unit composes a magnetic spring device which is comprised of a movable member disposed in a relatively movable state to a stationary member, a stationary magnet supported by a stationary holder, and a movable magnet supported by a movable holder, wherein the stationary holder and the movable holder are made of a non-magnetic material, at least either of the stationary magnet or the movable magnet is made of a magnetic material integrally incorporated when the stationary holder or the movable holder made of a non-magnetic material is molded, a slide member which comes in slide contact with the other party of the movable member or the stationary member when it moves relatively is provided at least on either of the movable member or the stationary member, and by selecting and disposing the slide member from that made of a magnetic material or that made of a non-magnetic material, a damping force can be adjusted.

In a preferred embodiment of the present invention, a magnet unit composes a magnetic spring device which is comprised of a movable member disposed in a relatively movable state to a stationary member, a stationary magnet supported by a stationary holder, and a movable magnet supported by a movable holder, wherein the stationary holder and the movable holder are made of a non-magnetic material, at least either of the stationary magnet or the movable magnet is made of a magnetic material integrally incorporated when the stationary holder or the movable holder made of a non-magnetic material is molded, and a plurality of the stationary members are oppposedly disposed at a distance from each other, the movable member is disposed between the adjacent stationary members and is relatively movable in the direction along the opposing face direction of the adjacent stationary members, and the spring characteristic of the magnet unit can be adjusted at will by adjusting the number of the stationary members and the movable members to be disposed.

In accordance with another aspect of the present invention, a method of producing a magnet unit is provided. The magnet unit is composed of a magnetic spring device which comprises a movable member disposed in a relatively movable state to a stationary member, a stationary magnet supported by a stationary holder, and a movable magnet supported by a movable holder, wherein a method of producing the magnet unit comprises the steps of; molding the stationary holder or the movable holder using a non-magnetic material while incorporating a magnetic material by means of insert molding; and magnetizing thereafter the magnetic material integrally incorporated therein to form the stationary magnet or the movable magnet.

In accordance with another aspect of the present invention, a method of producing a magnet unit is provided, wherein the non-magnetic material forming the stationary holder and the movable holder comprises a plastic material.

In accordance with another aspect of the present invention, a method of producing a magnet unit is provided. The magnet unit is composed of a magnetic spring device which comprises a movable member disposed in a relatively movable state to a stationary member, a stationary magnet supported by a stationary holder, and a movable magnet supported by a movable holder, wherein a method of producing the magnet unit comprises the steps of; pressing in a magnetic material into a mold during the molding process of the stationary holder or the movable holder using a non-magnetic material before finishing its hardening process to allow the magnetic material to be securely held taking advantage of heat shrinkage at the time of the hardening; and magnetizing thereafter the magnetic material integrally incorporated into the mold to form the stationary magnet or the movable magnet.

In accordance with the above aspect of the present invention, the non-magnetic material to form the stationary holder or the movable holder comprises a plastic material.

DETAILED DESCRIPTION OF THE PREFERRED EMBODIMENT

Figure 1:
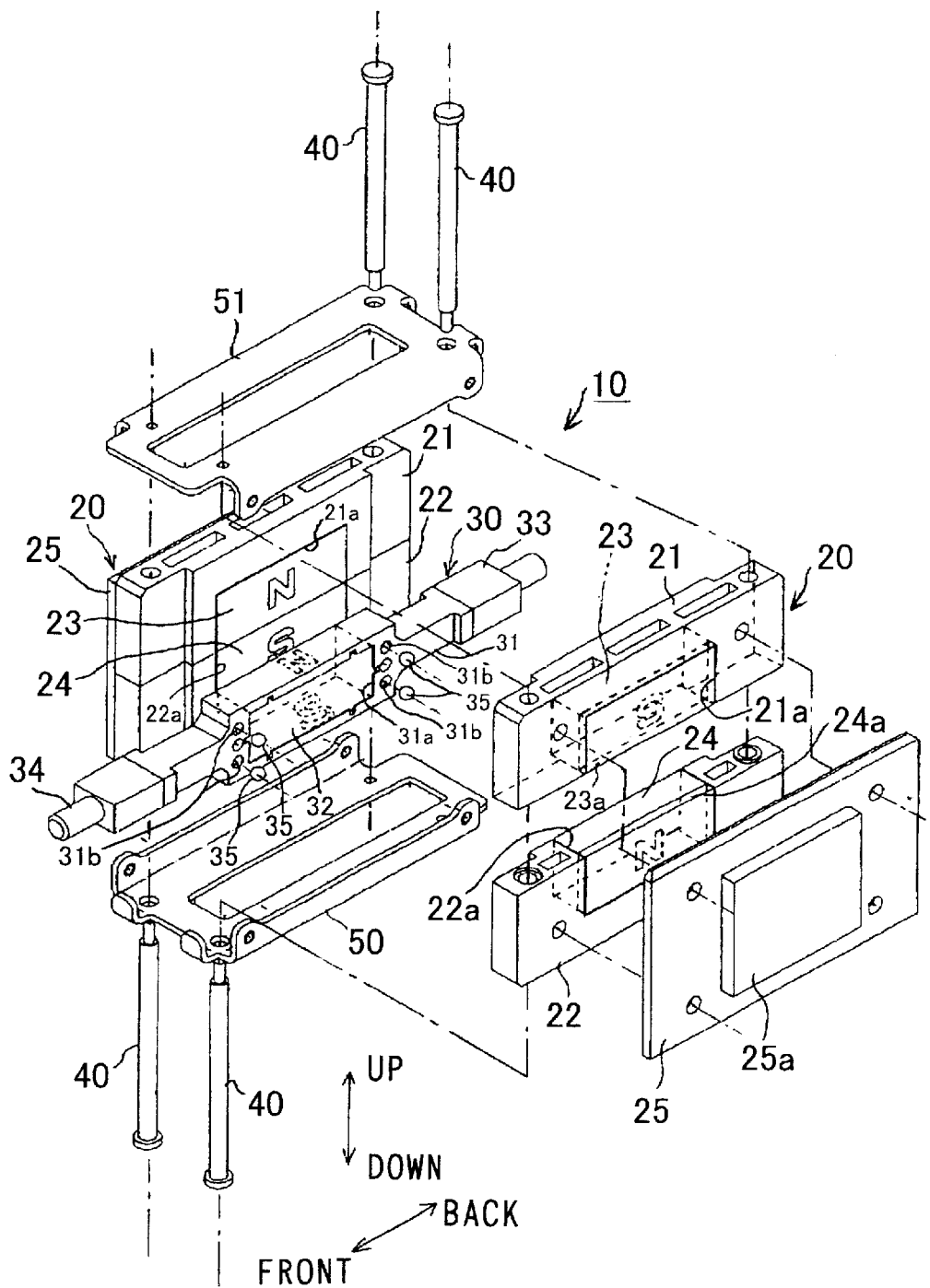
FIG. 1 is an exploded perspective view showing a magnet unit according to an embodiment of the present invention.

Preferred embodiments of the present invention will be explained below in more detail with reference to the drawings. FIG. 1 is an exploded perspective view showing a magnet unit 10 according to an embodiment of the present invention, and as shown in FIG. 1, the magnet unit 10 includes a stationary member 20 and a movable member 30.

In the present embodiment, the stationary member 20 is used in a pair with two pieces, which are opposedly disposed away from each other at a predetermined distance. Each stationary member 20 includes two stationary holders 21 and 22, and stationary magnets 23 and 24 are integrally held to each of the stationary holders 21 and 22.

The two stationary holders 21 and 22 are formed nearly in a shape of the letter U, disposed vertically in FIG. 1, the open end sides having concaves 21a and 22a being faced each other, and connected with pin members 40. The stationary magnets 23 and 24 are disposed in the concaves 21a and 22a respectively so that different magnetic poles are arranged in the thickness direction of the stationary holders 21 and 22. At this time, the stationary magnet 23 disposed in the upper side and the stationary magnet 24 disposed in the lower side are placed close together with almost no clearance formed, and the arrangement positions of the two stationary magnets adjacent to each other in the vertical direction are securely fixed by the leakage flux created between the upper stationary magnet and the lower stationary magnet and peculiar to a two-pole magnet.

The present invention is characterized in that the stationary magnets 23 and 24 are held in the concaves 21a and 22a without using an adhesive as a means for disposing the magnets in the concaves. The stationary holders 21 and 22 are made of a plastic material which is a non-magnetic material. Therefore, it is preferable to adopt the following means for holding the stationary magnets 23 and 24 in the concaves 21a and 22a without using an adhesive.

It can be cited as the above-described means that, first, a magnetic material having desired magnitude and shape is inserted into a mold to mold the stationary holders 21 and 22, and molded integrally in a state that the magnetic material is set in the concaves 21a and 22a of the stationary holders 21 and 22 by means of insert molding, and then the magnetic material is magnetized, for instance, in the thickness direction of the stationary holders 21 and 22 to form the stationary magnets 23 and 24.

Alternatively, it is also acceptable that in a process to mold the stationary holders 21 and 22 with a mold having a shape possible to form the concaves 21a and 22a, a magnetic material having a desired magnitude and shape is pressed in a portion where the concaves 21a and 22a are being formed at predetermined timing before it is cooled and hardened, and then the plastic material is hardened. The magnetic material thus pressed in is securely held in the concaves 21a and 22a due to heat shrinkage accompanied by progress of the hardening of the plastic material. Thereafter, the stationary magnets 23 and 24 are formed by magnetizing the magnetic material, for instance, in the thickness direction of the stationary holders, as described above. Incidentally, though a plastic material is used as a non-magnetic material in the above-described example, a non-magnetic metal such as aluminum can be used. In such a case, the magnet material can be integrally incorporated during the casting process so that it can be formed without using an adhesive. In addition, the force to fix the magnet to the holding portion can be further increased by utilizing plastic deformation by caulking and the like after the temporary fixing by heat shrinkage of the material so that the magnet material can be securely integrated without using an adhesive.

In the embodiment shown in FIG. 1, thickness adjusting boards 23a, 24a made of a magnetic material such as iron are laminated to the stationary magnets 23 and 24, and are also held integrally on the stationary holders 21 and 22 without using an adhesive, as in the case of the stationary magnets 23 and 24. That is, in each molding means for the above-described stationary holders 21 and 22, when the magnetic material to form the stationary magnets 23 and 24 is loaded, the thickness adjusting boards 23a and 24a are also loaded while being laminated on the magnetic material so that they are integrally molded. The thickness adjusting boards 23a and 24a are provided to make the thickness of the stationary magnets 23 and 24 including the thickness of the thickness adjusting boards 23a and 24a laminated on the stationary magnets 23 and 24, substantially equal to the thickness of the stationary holders 21 and 22, and to make the surface levels substantially equal to the surface levels of the front faces and back faces of the stationary holders 21 and 22 without replacement of the mold to mold the stationary holders 21 and 22, even when the thin stationary magnets 23 and 24 are used. Besides, since the thickness adjusting boards 23a and 24a are made of a magnetic material, they function as a yoke to form a magnetic circuit. It is needless to say that when the thickness of the stationary magnets 23 and 24 themselves is nearly equal to that of the stationary holders 21 and 22, there is no need to dispose the thickness adjusting boards 23a and 24a.

As described above, the stationary magnets 23 and 24 are magnetized respectively in the thickness direction and at the same time disposed while being held by the stationary holders 21 and 22 in a manner that two different poles are vertically adjacent to each other in FIG. 1. In addition, a pair of the stationary members 20 and 20 are opposedly disposed in a manner that the upper stationary magnets 23 and 23, and the lower stationary magnets 24 and 24 are disposed face to face having the same magnetic poles each other. The direction of the magnetization and the number of poles of the stationary magnets 23 and 24 are not limited to this, and it is also determined at will by such as the direction of magnetization and the number of poles of a movable magnet 32 which will be described later. In any case, it is satisfactory in the present embodiment if the movable magnet 32 is movable in two directions along the opposing face direction of the stationary magnets 23 and 24 and along the direction intersecting substantially at right angles thereto, in other words, in the directions to form a magnetic field affecting along the vertical direction and horizontal direction in FIG. 1. As a result, an effect of an attractive force or repulsive force varies according to the relative positions in the vertical or horizontal direction between the stationary magnets 23, 24 and the movable magnet 32 so that a kinetic spring constant of the magnetic spring device composed of these magnets is varied.

An outer frame 25 made of a plate-shaped magnetic material such as an iron plate is disposed on the outer faces of the thickness adjusting boards 23a and 24a (the stationary magnets 23 and 24 in the case when the thickness adjusting boards 23a and 24a are not disposed) and the stationary holders 21 and 22. The outer frame 25 is fixed to the stationary holders 21 and 22 with a screw and the like, and a portion laminated on the thickness adjusting boards 23a and 24a (the stationary magnets 23 and 24 in the case when the thickness adjusting boards 23a and 24a are not disposed) functions as a yoke portion 25a so that the leakage flux amount leaked toward outside from the stationary magnets 23 and 24 is reduced. In the embodiment shown in FIG. 1, the yoke portion 25a is formed thicker than other portions of the outer frame 25. The leakage flux amount can be reduced more by increasing the thickness of the yoke portion 25a.

Accordingly, the leakage flux amount can be varied at will by mounting the outer frame 25 having different thickness of the yoke portion 25a, and the magnetic force of the stationary magnets 23 and 24 affecting to the movable magnet 32 can be adjusted, so that a magnet unit having different spring characteristics (spring constant) can be formed with ease. Incidentally, the yoke portion 25a can be prepared with a plate member other than a main body portion of the outer frame 25 in advance and can be disposed by applying magnetic force or a means for adhering on the main body portion. (See FIG. 5)

The pair of the stationary members 20 and 20 are securely disposed at a predetermined distance in a state that the same magnetic poles are opposedly facing each other between a lower plate 50 and an upper plate 51 by inserting-through pin members 40 in four corners of the upper and lower plates 50 and 51. The movable member 30 is disposed between the stationary members 20 and 20. The distance between the stationary members 20 and 20 in this case is determined in a manner that a slide member 35 rotatably supported by a slide member holding concave 31b formed in the movable member 30 can come in slide contact with the stationary member 20, and it is preferable that a distance between the magnets of the stationary magnets 23, 24 and the movable magnet 32 is as small as possible. Thereby, magnetic force of the stationary magnets 23, 24 and the movable magnet 32 is effectively utilized, and the conversion efficiency of static magnetism energy between them can be heightened.

The movable member 30 includes a movable holder 31 and the movable magnet 32, and is connected directly and indirectly to a load mass element and the like which relatively displaces its position due to vibration, impact and so on. The movable holder 31 is made of a non-magnetic material such as a plastic material or a non-magnetic metal such as aluminum. The shape of the movable holder 31 is optional, and in the present embodiment, the movable holder 31 composes a long size member which is long in length in the horizontal direction in FIG. 1 as a whole, including a magnet holding hole 31a with a substantially square-shaped opening to hold the movable magnet 32 in a nearly central portion, and bolt members 33 and 34 to support the load mass element and the like directly or indirectly are mounted integrally at the both ends of the long size member. In addition, the length of the movable holder 31 is in the range that the bolt members 33 and 34 can extrude horizontally from the stationary members 20 and 20. Needless to say that the structure of the movable member 30 in FIG. 1 is only an example, and the bolt members 33 and 34 can be disposed only either side of the movable holders 31. In such a case, it is possible to form a structure in which only end portion having the bolt member is extruded from either front or rear portion between the stationary members 20 and 20. It is also possible to extrude other bolt members from at least either opening formed in the lower plate 50 or the upper plate 51 to support the load mass element and the like independently from the above bolt members 33 and 34 or together with the bolt members 33 and 34.

The movable magnet 32 is magnetized vertically in FIG. 1 so that the north pole is positioned in the upper face side and the south pole in the lower face side. This structure is shown as one of the preferred embodiments to obtain a desirable spring constant for the magnetic pole arrangement of the stationary magnets 23 and 24 in the present embodiment in which a two-pole magnet is formed with the upper pole and the lower pole putting together, and the direction of magnetization and the number of magnetic poles are not limited to the above description.

The thickness of the movable magnet 32 and the movable holder 31 loaded in the magnet holding hole 31a are optional and can be determined at will in relation to the strength and the like of each magnetic field of the movable magnet 32 and the stationary magnets 23, 24. In any event, as described above, the thickness is determined in a range that a slight gap exists between each of the stationary magnets 23, 24 and the movable magnet 32 between the pair of the stationary members 20 and 20 which are opposedly disposed.

In order to make it possible to move the movable member 30 vertically and horizontally along the opposing face direction between the pair of the stationary members 20 and 20 while maintaining the slight gap, slide member holding concaves 31b are formed around the periphery of the magnet holding hole 31a in the movable holder 31, and the slide members 35 are supported by the slide member holding concaves 31b. The slide members 35 are formed in a sphere shape in the present embodiment and rotatably supported in the slide member holding concaves 31b so that each surface of the slide members can come in slide contact with the respective opposing faces of the stationary holders 21 and 22 while rotating. By applying the slide members 35, the frictional resistance can be reduced compared with the case that, for instance, by forming the thickness of the movable holder 31 itself thicker than that of the movable magnet 32 so that the movable holder 31 comes in slidable face-contact directly with the stationary holders 21 and 22. Incidentally, the slide member 35 is acceptable so far as it makes the slide friction smaller compared with the case that the movable holder 31 comes in contact directly with the stationary holders 21 and 22, and is not limited to a spherical shape and it may be of a plate shape.

When the slide member 35 is formed with a non-magnetic material, it only shows a function to make the frictional resistance smaller than the case when the movable holder 31 is allowed to come in contact with directly with the stationary holders 21 and 22. However, when the slide member is made of a magnetic material, the resistance is increased due to the effect of magnetic field caused by the movable magnet 32 or the stationary magnets 23, 24 so that the damping ratio can be increased. Especially when the slide member 35 comprised of a magnetic material is used, the magnetic flux created by the magnetic field of the movable magnet 32 or the stationary magnets 23, 24 can be controlled (integration of overcurrent or magnetic flux) according to the selection of the shape, for instance, whether it is of a spherical shape or of a plate shape, in other words, it can vary the magnetic field between the gaps by means of lens effect that it converges the magnetic flux when it is of a spherical shape and it diverges the magnetic flux when it is of a plate shape, thereby the friction of the slide member 35 can be easily changed. As a result, according to the weight of the load mass element and the like to be controlled, the magnitude of the vibration and impact to be damped, the slide member can be selectively used from that made of a non-magnetic material or from that made of a magnetic material, and when the slide member is selected from that made of a magnetic material, it can be constructed to have various frictional characteristics (damping force) further according to its shape, size and so on.

Here, the movable holder 31 made of a plastic material or the like that is a non-magnetic material and the movable magnet 32 are integrally formed without using an adhesive. As a means to produce them, similar to the case when the stationary holders 21 and 22, and the stationary magnets 23 and 24 are integrally formed, a magnet material can be integrally formed by insert molding, or a magnet material can be integrated by utilizing the heat shrinkage occurred during cooling and hardening at the time of molding the movable holder 31. After integrating the magnet material, similar to that described above, a magnetization treatment is given to form the movable magnet 32. Besides, in the present embodiment, the bolt members 33 and 34 are integrally molded when the movable magnet 32 is integrally molded so that the base portions (not shown) of the bolt members 33 and 34 disposed at both ends of the movable holder 31 are buried into both ends of the movable holder 31. Thus, the production process can be simplified, so that its production efficiency can be improved. Incidentally, in this embodiment, though both of the stationary magnets 23, 24 and the movable magnet 32 are fixed to the stationary holders 21, 22 and the movable holder 31 respectively without passing through a bonding process, by producing it through a means to integrate at least either of the movable magnet with the movable holder or the stationary magnets with the stationary holders at the time of the molding described above, the production efficiency can be improved more compared with the prior art of fixing both magnets with an adhesive.

According to the present embodiment, the movable member 30 is movably disposed between the stationary members 20 and 20 along the opposed face direction not only vertically but also horizontally. In other words, though it has a two-degree-of-freedom system which is movable in two directions orthogonal to each other among the directions along the opposed face of the stationary magnets 23 and 24, effect of an attractive force or a repulsive force of the stationary magnets 23 and 24 to the movable magnet 32 can be varied with a quite simple structure even when it relatively displaces in any direction, and the kinetic spring constant of the magnetic spring formed with both magnets can be varied.

Figure 2:
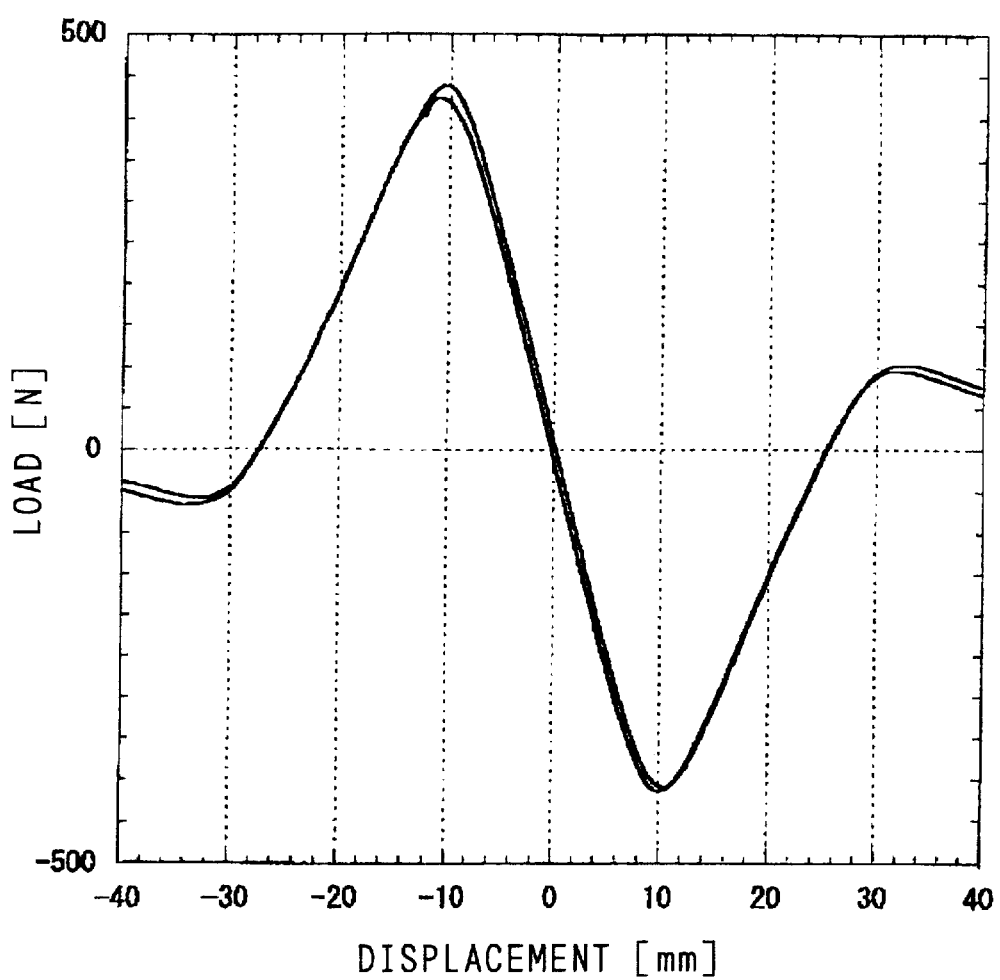
FIG. 2 is a diagram showing load-displacement characteristics of the magnet unit according to the above-described embodiment.

FIG. 2 is a figure showing load-displacement characteristics when the movable member 30 is vertically displaced between the stationary members 20 and 20 along the opposed face direction. Incidentally, a non-magnetic material is used as the slide member 35, and it is set up to be able to slidably contact while the distance between each of the opposing faces of the respective stationary magnets 23, 24 and the movable magnet 32 is kept to 1 mm by means of the slide member 35. In FIG. 2, a positive value in load shows that the movable magnet 32 received an upward force by the stationary magnets 23 and 24, and a negative value shows that the movable magnet 32 receives a downward force by the stationary magnets 23 and 24. The position having a displacement amount of 0 mm is a position where the movable magnet 32 confronts around a border between the stationary magnet 23 disposed upside and the stationary magnet 24 disposed downside, and the position upper than the above-described position is shown in a negative value and the position lower than the above-described position is shown in a positive value.

As is clear from FIG. 2, it is understood that an spring constant being non-linear as a whole can be obtained, which varies the magnitude of the spring constant expressed by a slope of the curve and its sign in positive and in negative by displacing the movable member 30 vertically between the stationary members 20 and 20. Accordingly, for instance, by utilizing a range in a partially linear negative spring constant appeared in the range of a displacement amount of −10 mm to that of +10 mm, a metal spring (not shown) with a positive linear spring constant value having the same inclination as above is connected to the movable member 30 and disposed, so that a vibration damping apparatus having a substantially zero spring constant superimposed by both in this range of the displacement amount is provided.

Figure 3:
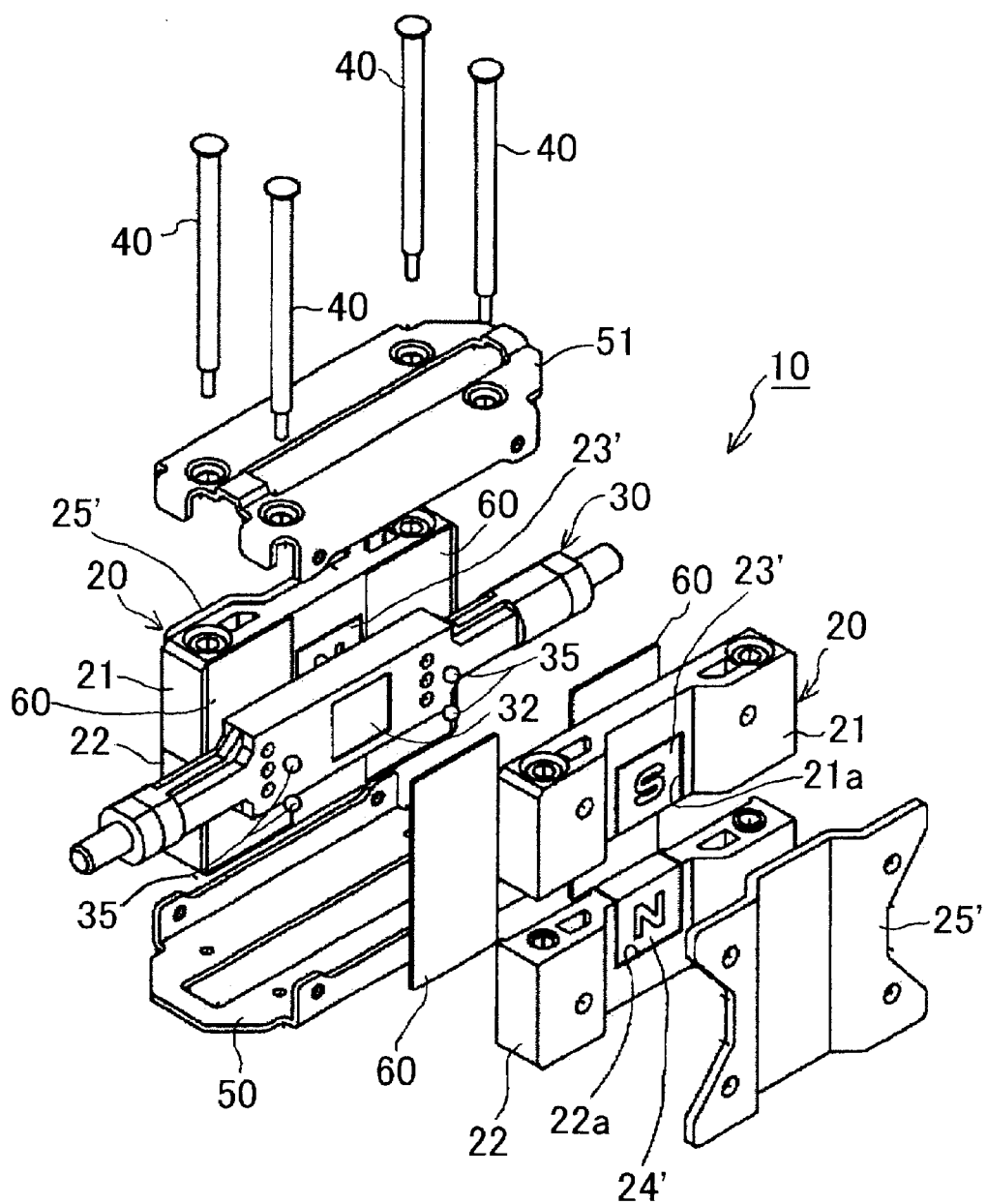
FIG. 3 is an exploded perspective view showing a magnet unit according to another embodiment of the present invention.
Figure 4:
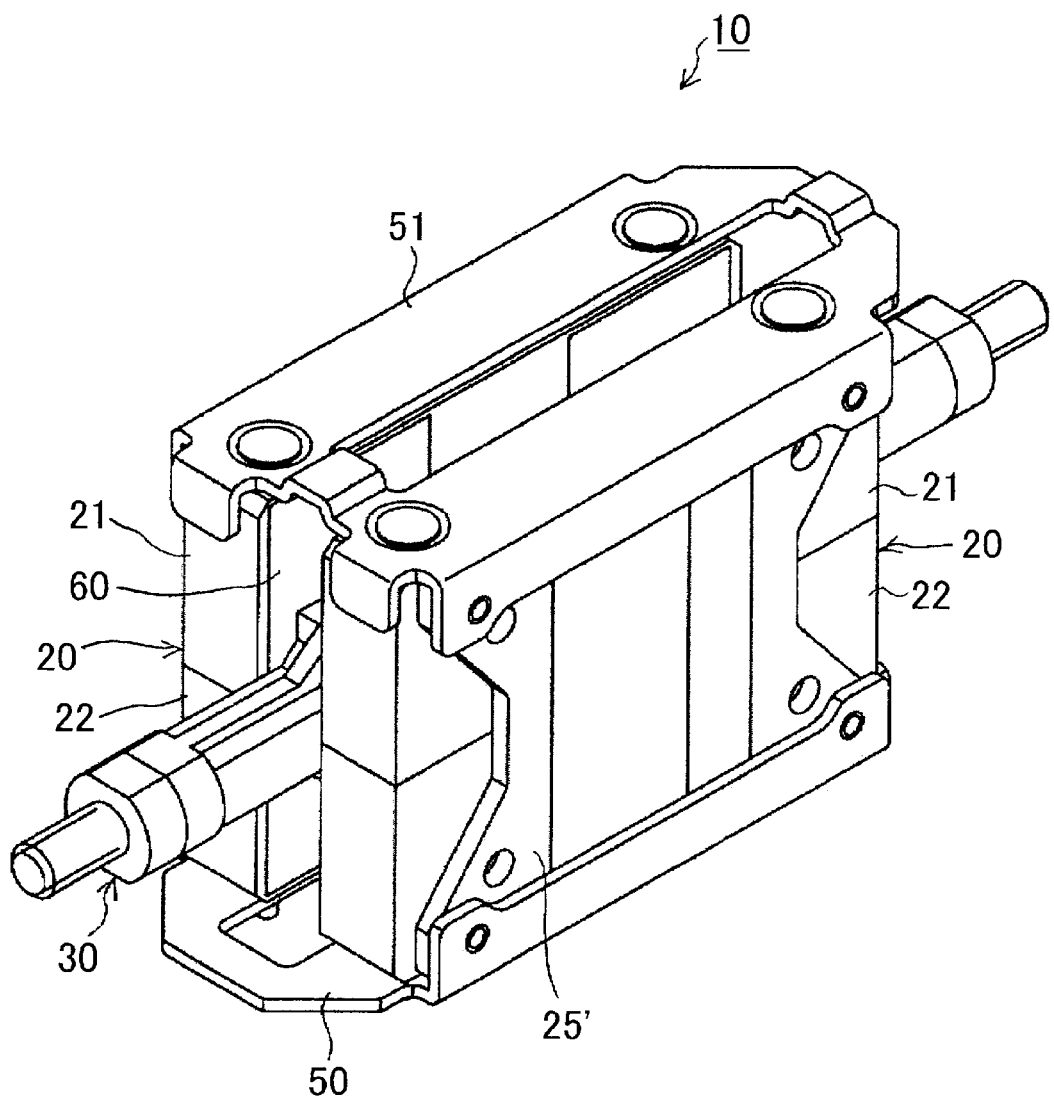
FIG. 4 is an outside perspective view showing a magnet unit according to another embodiment of the present invention.

FIG. 3 and FIG. 4 shows a magnet unit 10 according to another embodiment of the present invention. Incidentally, the same members as in the above embodiment are shown with the same numbers and symbols. The present embodiment is characterized in that stationary magnets 23' and 24' having a magnetic force weaker than that in the above embodiment are adopted to reduce the weight, and the stationary magnets 23' and 24' thinner and smaller than those in the above embodiment are adopted, though the same method of production can be adopted as the above embodiment. Accordingly, the concaves 21a and 22a formed in the stationary holders 21 and 22 are set to be thinner and smaller than those in the above embodiment, corresponding to the stationary magnets 23' and 24'.

An outer frame 25' has a uniform thickness, but since the concaves 21a and 22a formed in the stationary holders 21 and 22 are thin and a portion around the center in the width direction of the stationary holders 21 and 22 is of a recessed shape, in order to conform to this shape, a portion near the central portion in the width direction of the outer frame 25 is protrusively bent in the direction to come in contact with the stationary magnets 23' and 24'. Different from the outer frame 25 in the above embodiment, the outer frame 25' has no yoke 25a which is thicker than other portions, but it can satisfactorily perform the function to reduce the leakage flux amount leaking towards outside even the thickness of the outer frame 25' is uniform, because the magnetic force of the stationary magnets 23' and 24' is lowered, thereby making it lightweight.

Further in the present embodiment, thin plate members 60 made of stainless steel are fixed on the surfaces of the other party which are inner surfaces of the stationary holders 21, 22 and the slide member 35 of the movable member 30 slidably moves thereon by adhering or setting. As a result, a boundary (a difference in level) between the stationary holders 21 and 22 which are vertically adjacent to each other can be cancelled, and the frictional resistance can be lowered compared to the case when the slide member 35 directly comes in contact with the stationary holders 21 and 22 made of plastic. It is needless to say that the structure to fix the thin plate member 60 made of stainless steel in order to reduce the frictional resistance as above can be adopted in the above-described embodiment.

Figure 5:
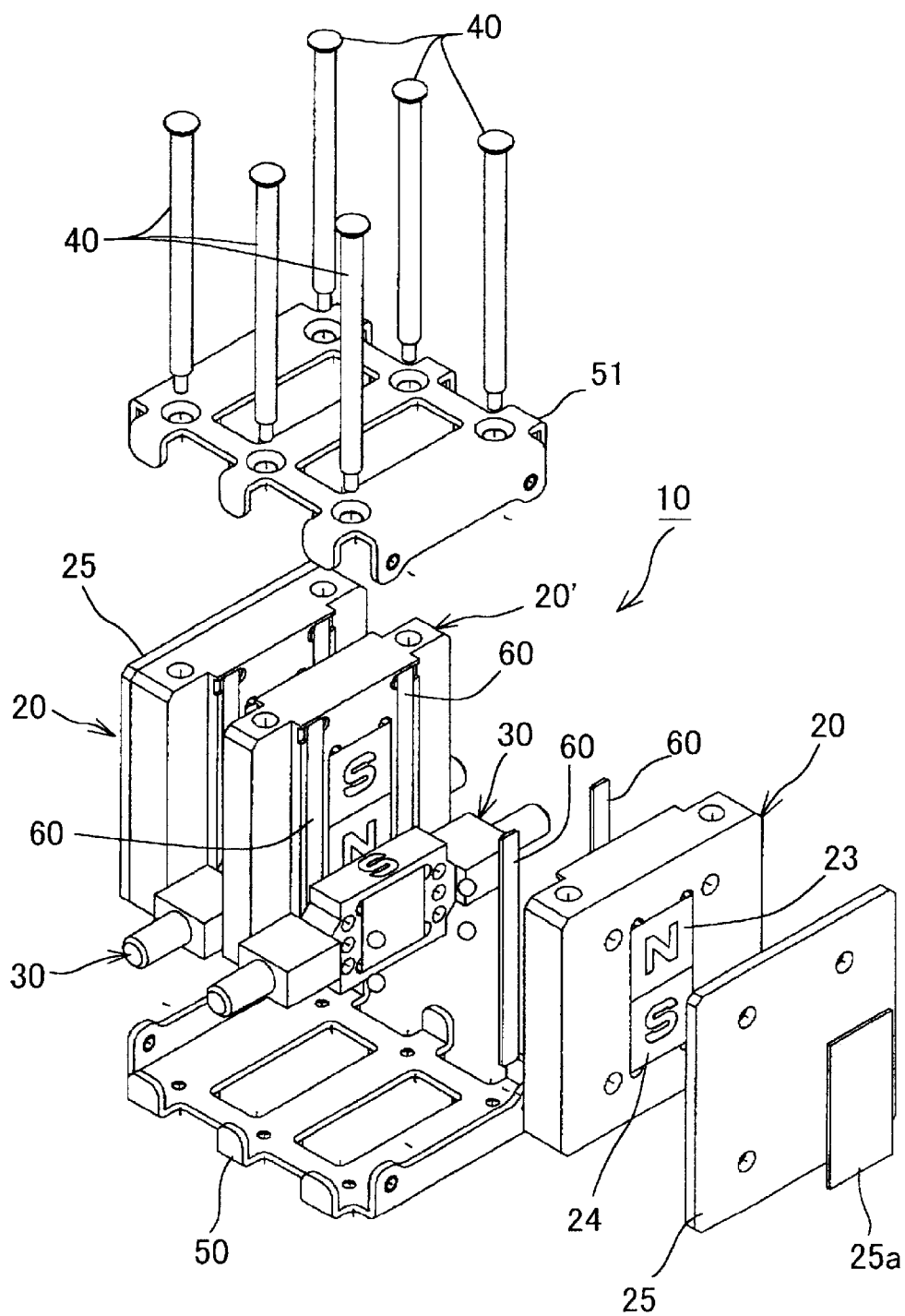
FIG. 5 is an exploded perspective view showing a magnet unit according to still another embodiment of the present invention.

Alternatively, as in another embodiment shown in FIG. 5, it is possible to have a structure in which a stationary member (central stationary member) 20' having substantially similar structure is further provided between the stationary members 20 and 20 disposed in both sides in a manner that each of the faces of the central stationary member 20' faces to respective stationary members 20 and 20, and the movable members 30 are provided between the stationary member 20 disposed in one side and the central stationary member 20', and between the stationary member 20 disposed in the other side and the central stationary member 20' respectively. It should be noted that the central stationary member 20' is provided with thin plate members 60 made of stainless steel on its both sides by adhering or setting to reduce friction caused between respective slide members 35 of the movable member 30 and the central stationary member 20'. By making the structure as above, the spring constant of the magnetic spring device composed of respective movable and stationary magnets can be characteristically different from the case when only one movable member 30 is disposed as in each embodiment described above. Needless to say, it is also possible to have a structure in which the number of the stationary members and the movable members disposed therein is increased more.

Though in each embodiment described above, the magnet unit 10 composing a magnetic spring device having two degrees of freedom is explained as an example, it should be noted that the present invention is not limited to this, and as for a magnetic spring device having one degree of freedom or three or more degrees of freedom, it is also applicable when a stationary magnet and/or a movable magnet is integrally incorporated into respective holders. In addition, though the above-described explanation is made for the case when the leakage flux amount is varied by adjusting the thickness of the outer frames 25 and 25', it is also possible to adjust the leakage flux amount by varying the number of disposed pieces (the number of pieces laminated) or the magnitude (area) of the outer frames 25 and 25' besides varying the thickness of the outer frames 25 and 25' themselves.

In the magnet unit composing the magnetic spring device of the present invention, the stationary holder and the movable holder are formed with a non-magnetic material such as a plastic material and the like, and at least either one of the stationary magnet or the movable magnet is formed with a magnetic material which is integrally incorporated at the time of molding the stationary holder or the movable holder made of a non-magnetic material such as a plastic material and the like. The method of production according to the present invention is characterized in that it has a process of integrally incorporating the magnetic material at the time of molding the stationary holder or the movable holder made of a nonmagnetic material such as a plastic material and the like. Accordingly, it is not necessary to firmly fix the stationary magnet and the movable magnet on each other with an adhesive as in the prior art, so that the production process is simplified, thereby the production efficiency can be improved.

Additionally, by opposedly disposing a pair of the stationary members apart from each other, and by disposing the movable member relatively movably between this pair of the stationary members in two directions along the opposing face direction of the pair of the stationary members and along the direction intersecting substantially at right angles thereto, a magnetic spring device having two degrees of freedom with a simple structure can be provided. In addition to this, by varying at least one factor of the outer frame laminated on the stationary magnet among the thickness, magnitude, and the number of pieces to be disposed, the leakage flux amount can be changed, so that the magnetic force of the stationary magnet to the movable magnet can be easily adjusted, thereby providing a magnet unit which can adjust the spring characteristics at will. Furthermore, by selecting and disposing a slide member to be disposed at least on either of the movable member or the stationary member from that made of a magnetic material or from that made of a non-magnetic material, a magnet unit which can easily adjust the damping force can be provided. Still further, by adjusting the number of the stationary members and the movable members to be disposed, a magnet unit which can adjust the spring characteristics at will can be provided.

While preferred embodiments of the invention have been described with a certain degree of particularity with reference to the drawings, obvious modifications and variations are possible in light of the above teachings. The scope of the invention is to be determined from the claims appended thereto.

What is claimed is:

1. A magnet unit composing a magnetic spring device comprising:
    a movable member disposed in a relatively movable state to a stationary member;
    a stationary magnet supported by a stationary holder;
    a movable magnet supported by a movable holder;
    a slide member that is structured and arranged to slidably contact one of said movable member and said stationary member when said movable member moves; and
    wherein said stationary holder and said movable holder are made of a non-magnetic material, end at least one of said stationary magnet is integrally incorporated into said respective stationary holder and said movable holder when said respective holder is molded.

2. A magnet unit according to claim 1, wherein said slide member is made of a magnetic material.

3. A magnet unit according to claim 1, wherein said slide member is made of a non-magnetic material.

4. A magnet unit composing a magnetic spring device comprising:
    a movable member disposed in a relatively movable state to a stationary member;
    a stationary magnet supported by a stationary holder; and
    a movable magnet supported by a movable holder,
    wherein said stationary holder and said movable holder are made of a non-magnetic material, at least one of said stationary magnet and said movable magnet being integrally incorporated into said respective stationary holder and movable holder made of a non-magnetic material when said respective holder is molded, and
    a movable slide member which comes in slide contact with one of said movable member and said stationary member.

5. A magnet unit according to claim 4, wherein said slide member is made from a non-magnetic material.

6. A magnet unit according to claim 4, wherein said slide member is made from a magnetic material.

7. A magnet unit composing a magnetic spring device comprising:
    a movable member disposed in a relatively movable state to a stationary member;
    a stationary magnet supported by a stationary holder; and
    a movable magnet supported by movable holder,
    wherein said stationary holder and said movable holder are made of a non-magnetic material, and at least one of said stationary magnet and said movable magnet is integrally incorporated into said respective stationary holder and said movable holder when said respective holder is molded, and
    wherein an outer frame made of a magnetic material, laminated on said stationary magnet, and at least a portion of the outer frame function as a yoke.

8. A magnet unit according to claim 7, wherein a non-magnetic material making said stationary holder or said movable holder comprises a plastic material.

9. A magnet unit according to claim 7, wherein a thickness adjuster made of a magnetic material is laminated on said stationary magnet to make its thickness substantially equal to the thickness of said stationary holder.

10. A magnet unit according to claim 7, wherein said outer frame varies the leakage flux amount by changing at least one of factors among thickness, magnitude, or the number of said outer frames to be disposed so that the magnetic force of said stationary magnet to said movable magnet can be adjusted.

11. A magnet unit according to claim 7, further comprising:
a slide member structured and arranged to slidably contact one of said movable member and said stationary member when said movable member moves said slide member being provided on at least on one of said movable member and said stationary member.

12. A magnet unit according to claim 11, wherein said slide member is made of a magnetic material.

13. A magnet unit according to claim 11, wherein said slide member is made of a non-magnetic material.

14. A magnet unit according to claim 7, wherein said stationary member includes first and second opposed members arranged at a distance from one another, and said movable member is arranged between said first and second opposed members, and wherein said movable member moves in a first direction along the opposed faces of said first and second opposed members and along a second direction that is substantially at right angles to said opposed faces of said first and second opposed members.

15. A magnet unit according to claim 7, wherein said stationary member includes three or more of opposed members arranged at a distance from each other, and said movable member disposed between adjacent ones of said opposed members, wherein said movable member moves in a first direction along the opposed faces of said adjacent ones of said opposed members and along a second direction that is substantially at right angles to said opposed faces of said adjacent ones of said opposed members.

16. A magnet unit composing a magnetic spring device comprising:
a movable member disposed in a relatively movable state to a stationary member;
a stationary magnet supported by a stationary holder; and
a movable magnet supported by a movable holder,
wherein said stationary holder and said movable holder are made of a non-magnetic material, at least one of said stationary magnet and said movable magnet being integrally incorporated into said respective stationary holder and movable holder made of a non-magnetic material when said respective holder is molded, and by selecting at least one of the factors among thickness, magnitude, or the number of the outer frames to be disposed, made of a magnetic material, laminated on said stationary magnet, and at least one portion thereof functioning as a yoke, a leakage flux amount is varied so that the magnetic force of said stationary magnet to said movable magnet can be adjusted, thereby the spring characteristics of said magnetic spring device can be adjusted at will.

17. A magnet unit composing a magnetic spring device comprising:
a movable member disposed in a relatively movable state to a stationary member;
a stationary magnet supported by a stationary holder; and
a movable magnet supported by a movable holder;
wherein said stationary holder and said movable holder are made of a non-magnetic material, at least one of said stationary magnet and said movable magnet being integrally incorporated into said respective stationary holder and said movable holder made of a non-magnetic material when said respective holder is molded,
wherein said stationary member comprises a plurality of opposed members arranged at a distance from each other, said movable member is disposed between adjacent ones of said opposed members and is relatively movable in a direction along the opposed faces of said adjacent ones of said opposed members, and a spring characteristic of said magnet unit can be adjusted at will by adjusting the number of said stationary members and said movable members to be disposed.

* * * * *